Patented Feb. 3, 1925.

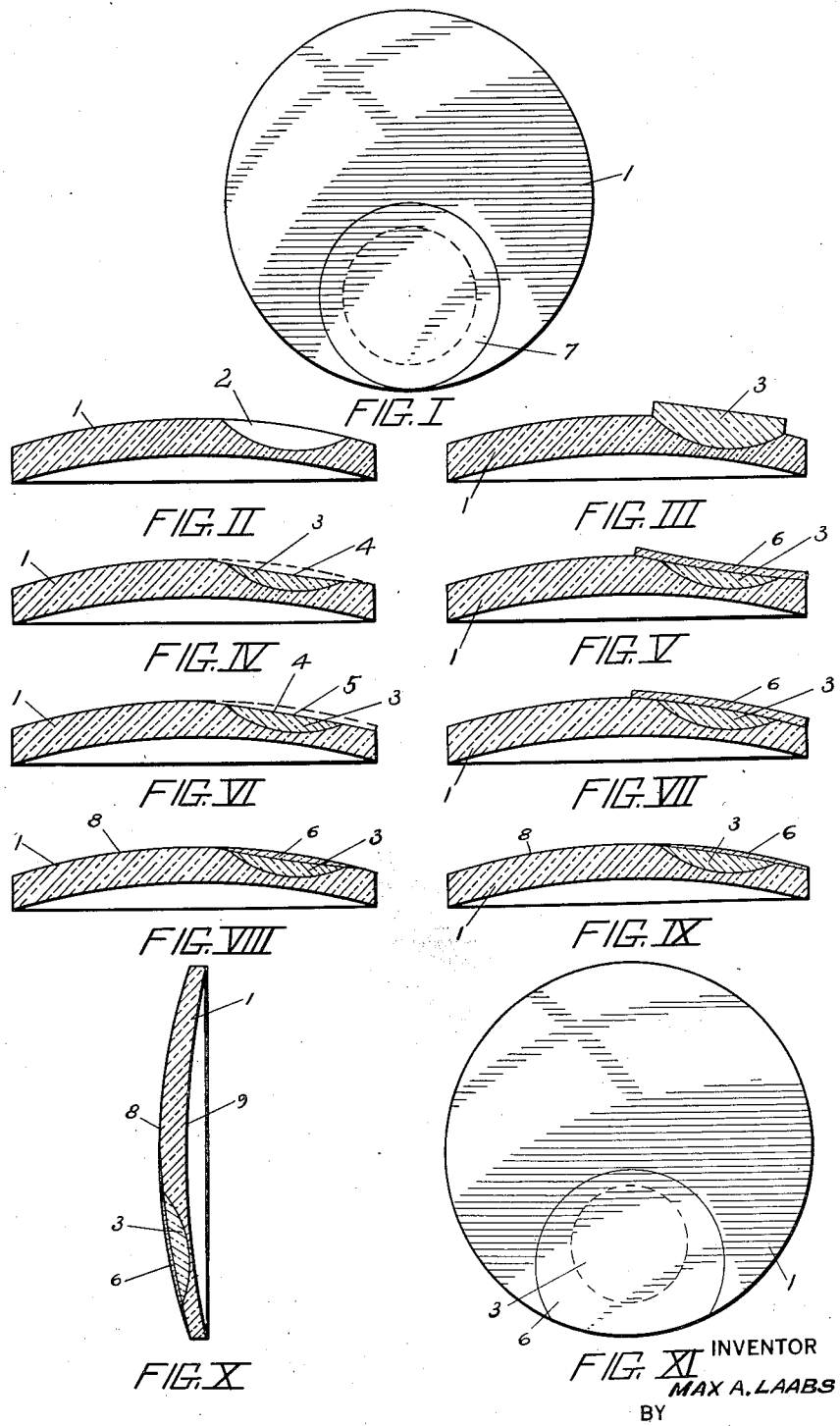

1,525,244

UNITED STATES PATENT OFFICE.

MAX A. LAABS, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC LENS.

Application filed November 17, 1922. Serial No. 601,507.

*To all whom it may concern:*

Be it known that I, MAX A. LAABS, a citizen of the United States, residing at Southbridge, in the county of Worcester and State of Massachusetts, have invented certain new and useful Improvements in Ophthalmic Lenses, of which the following is a specification.

The invention relates to improvements in ophthalmic lenses and has particular reference to an improved form of bifocal or multi-focal lens and to an improved method or process of producing the same.

One of the principal objects of the present invention is the provision of a novel and improved multi-focal lens of the two part type formed from two or more portions of glass, certain of which have different indices of refraction, in which the flint or portion with higher index of refraction shall be entirely embedded within the hard or crown glass forming the major portion of the lens and thoroughly protected against scratching or the like.

A further object of the present invention is the provision of a lens of this character in which varying corrections may be placed on the side of the lens in which the button has been fused or secured without affecting the addition or increased power through the said button.

Another object of the present invention is the provision of a novel and improved lens and process of producing the same which will make it possible to use the same blank and affixed button to produce different reading corrections or additions and in which it will be possible to produce such differences without variances in the final curve placed on the exposed faces of the lens.

Another object of the present invention is the provision of a novel an improved process of which the fusion of parts in a lens of this character may be readily effected and without liability of deformation of the major portion of the blank during the fusing operations.

With these and other objects in view the invention consists in the novel features of construction and steps or processes hereinafter described and it will be understood that any variation in the specific features described may be made within the scope of the appended claims without departing from or exceeding the spirit of the invention Figure I represents a plan or face view of a blank embodying this invention.

Figure II represents a sectional view illustrating the initial step in the production of the lens.

Figure III represents a similar view of a succeeding step.

Figure IV represents the grinding away of the lens after the operation of Figure III has been completed.

Figure V represents a sectional view illustrating the supplemental segment member secured in position.

Figure VI represents a view similar to Figure IV.

Figure VII represents a view similar to Figure V but in connection with the structure shown in Figure VI.

Figure VIII represents a sectional view through a semi-finished blank made from the original blank shown in Figure V.

Figure IX represents a similar view made from the blank shown in Figure VII.

Figure X represents a vertical sectional view of a finished lens, and Figure XI represents a face view thereof.

In the drawings in which similar characters of reference are employed to denote corresponding parts throughout the several views the numeral I designates the main or major portion of a bifocal lens blank, this portion being ordinarily formed from hard crown glass which has a relatively low index of refraction. In the production of the present improved bifocal there is formed eccentrically in the body portion 1 the countersink or recess 2 preferably spaced somewhat from the edge but to one side of the major blank 1, while into this recess is fitted a correspondingly shaped button 3 which is preferably of flint or other glass having a higher index of refraction than the base portion 1 and it is preferred that these parts be united as by fusion in the relationship shown in Figure III. I now have a blank somewhat similar to that used in the production of what is commercially known as a Kryptok lens in which the difference in power through the distance and reading portions is caused by the difference in the refraction indices of the two glasses 1 and 3, it being customary to surface the side on which the two different kinds of glass are disposed off to a single continuous curve and the power in the socalled reading portion of the lens depending on the index of refraction coupled with the curve of the countersink 2 and of the exposed part of the button.

In the case of the present invention, however, in place of surfacing off the entire upper face of the blank shown in Figure III the segment bearing portion only is surfaced off to desired curve which may be either a concave curve shown as at 4 in Figure IV or a convex curve as shown at 5 in Figure VI or at any variation of either of these curves within the limits imposed by the structure itself. It will be understood that this surfacing off of the upper surface of the button 3 serves to vary the power in the button since if it has a concave upper face such as 4 it will have less inherent power than if it has a convex upper face as at 5. In either event the button and adjacent portion of the blank 1 having been surfaced off to the desired curve I place thereover the cover member 6 which is in the form of a relatively thin disc, preferably of the same material and same index of refraction as the body portion 1. The composite blank is then again subjected to a fusing temperature but on account of the fact that the member 6 is relatively quite thin as compared to the body portion 1 as well as smaller in area it is possible to sufficiently heat the parts so that the member 1 will satisfactorily subside upon and become firmly united with both the portion 3 and the surrounding ground away zone 7 of the major blank 1 without either the portion 3 or portion 1 being so softened as to flow or be in any way distorted. The composite blank will then present the appearance shown in Figures V and VII.

The next step in my process consists in surfacing off the blank 1 and attached parts in a single continuous curve as at 8 when a semi-finished blank is produced having an inserted addition 3 whose power is governed by the relationship between the curves on its two faces coupled with the difference in index of refraction between the member 3 and the enclosing portions 1 and 6 therefor. It is to be noted that the power produced by the members 3 having the same power or countersink is capable of variation by grinding of different curves 4 but that once the blank is completed while different surfaces or curves 8 may be placed thereon and also different surfaces as at 9 to complete or finish the lens, the placing of these curves can in no wise affect the amount of added power through what is ordinarily termed the reading portion of the lens since this being enclosed entirely within the bifocal by the ordinary crown glass on both sides will be unaffected by the curves placed on the finished lens.

I claim:

1. A bifocal lens comprising a major portion of one index of refraction having a steeper curved countersink formed therein surrounded by a zone of less steep curvature, a portion of glass of different index of refraction from the major blank secured in the countersink of steeper curve and wafer of the same index of refraction as the major blank secured to the surface of the shallower countersink of the main blank.

2. A bifocal lens comprising a major portion of crown glass having a steeper curved countersink formed therein surrounded by a zone of less steep curvature, a portion of flint glass secured in the countersink of steeper curve, and a crown glass wafer secured to the surface of the zone of less steep curvature.

3. A bifocal lens comprising a major portion of one index of refraction and having a curved countersink therein, a segment of a different index of refraction secured in the countersink, said segment having its outer surface curved and lying below that of the major portion, and a wafer of the same refractive index as the major portion overlying the segment.

4. A bifocal lens comprising a major portion of one index of refraction and having a curved countersink surrounded by a zone of shallower curvature, a segment of a different index of refraction mounted in the countersink, the outer surface of the segment being continuous with that of the surrounding zone, and a wafer of the same refractive index as the major portion overlying the segment.

5. A bifocal lens comprising a crown glass major portion having a curved countersink surrounded by a zone of shallower curvature, a flint button disposed in the countersink and having its outer surface continuous with that of the surrounding zone, and a crown glass cover overlying the button and the continuously curved surrounding zone.

MAX A. LAABS.